No. 665,424. Patented Jan. 8, 1901.
R. W. H. FUNK.
BOTTLE.
(Application filed Apr. 2, 1900.)

(No Model.)

WITNESSES
John Buckler,
F. A. Stewart

INVENTOR
Richard W. H. Funk,
BY Edgar Tate & Co.
ATTORNEYS

UNITED STATES PATENT OFFICE.

RICHARD W. H. FUNK, OF NEW YORK, N. Y., ASSIGNOR OF ONE-HALF TO THOMAS F. O'ROURKE, OF SAME PLACE.

BOTTLE.

SPECIFICATION forming part of Letters Patent No. 665,424, dated January 8, 1901.

Application filed April 2, 1900. Serial No. 11,180. (No model.)

*To all whom it may concern:*

Be it known that I, RICHARD W. H FUNK, a citizen of the United States, residing at New York, in the county of New York and State of New York, have invented certain new and useful Improvements in Bottles, of which the following is a full and complete specification, such as will enable those skilled in the art to which it appertains to make and use the same.

This invention relates to bottles, jugs, jars, and similar vessels; and the object thereof is to provide an improved neck attachment or stopping device for vessels of this class whereby when the vessel has been filled and the stopping device secured in position in the neck thereof the vessel may be emptied of its contents, but cannot be refilled or reused.

Figure 1:
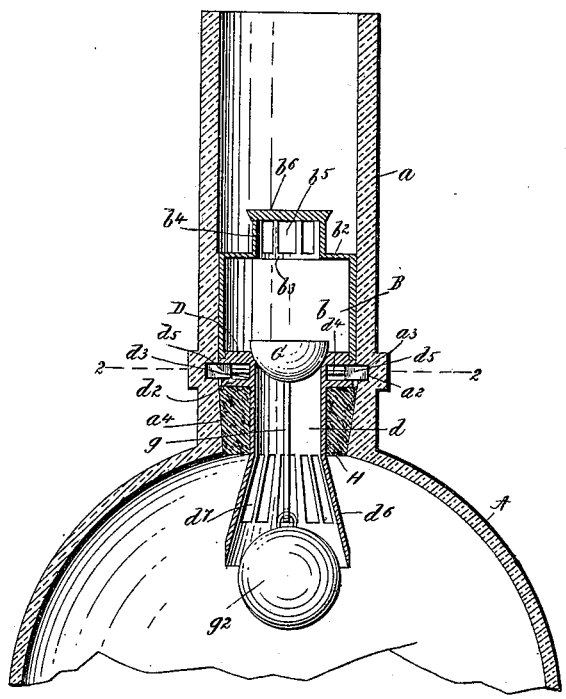
Figure 2:
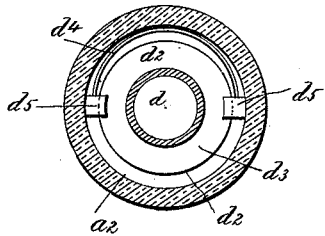

In the accompanying drawings, forming part of this specification, in which like reference characters denote like parts in both views, Figure 1 is a central vertical section of the upper part of a bottle and the neck thereof and showing my improvement, and Fig. 2 a transverse section on the line 2 2 of Fig. 1.

In the practice of my invention as shown in the drawings I provide a bottle or other vessel A, only the upper portion of which is shown, and said bottle is provided with a neck $a$, near the bottom portion of which is an inner annular groove $a^2$, and said neck is preferably enlarged around said groove, as shown at $a^3$. The inner portion of the neck, at the bottom thereof, is contracted inwardly and downwardly to form a plug or valve seat $a^4$. I also provide a tubular casing B, in which is formed a chamber $b$, the upper portion of which is provided with an annular top plate $b^2$, at the center of which is an opening $b^3$, around which is an upwardly-directed casing $b^4$, provided with side ports or passages $b^5$, and the casing $b^4$ is provided with a top cap $b^6$. The bottom portion of the tubular casing B, which closely fits the neck of the bottle, consists of a plate D, which is secured in the casing B, and said plate D is provided with a central downwardly-directed tubular extension $d$, around which is formed, near the top thereof, an annular flange $d^2$, between which and the plate D is an annular groove $d^3$, in which is placed a spring $d^4$, provided at each end with a block or head $d^5$. The lower end of the tubular casing $d$ is flared outwardly or bell-shaped, as shown at $d^6$, and said lower end is provided with side ports or passages $d^7$, and placed in the upper end of the tubular casing $d$ is a semispherical valve G, provided with a central depending rod $g$, with the lower end of which is loosely connected a weight $g^2$, which is preferably spherical in form. The length of the rod $g$ is such that however the bottle may be tilted the weight $g^2$ will engage the inner surface of the bell-shaped lower end $d^6$ of the casing $d$, as clearly shown in Fig. 1 of the drawings.

In practice a packing, plug, cork, or similar device is secured around the upper portion of the tubular casing $d$, as shown at H, and the spring $d^4$ is placed in the groove $d^3$ and the entire device is forced downwardly into the neck of the bottle until the groove around the upper end of the tubular casing $d$ registers with the groove $a^2$ in the neck of the bottle, at which time the ends of the spring $d^4$ are thrown outwardly and the blocks or heads $d^5$ enter the groove $a^2$ and are partially in said groove and partially in the groove $d^3$, and by this means the attachment is securely locked in the neck of the bottle. In this operation the cork, plug, or other device H is firmly seated on the inclined inner surface $a^4$ at the bottom of the neck $a$, as shown in the drawings, and the neck around the attachment or the lower end thereof is securely closed.

It will be understood that before inserting the attachment, as before described, the bottle or other vessel is first filled with the desired contents, and after this has been done and the attachment secured in place the bottle or other vessel can be emptied of its contents, but cannot be refilled or reused. It will also be understood that after the vessel has been filled and the attachment inserted the top of the neck is closed by a cork or stopper in the usual manner, and when it is desired to empty the vessel said cork or stopper, which is not shown, is removed and the bottle or vessel is tilted in the usual manner. This operation causes the valve G to leave its seat, being forced therefrom by the weight $g^2$, which engages the inner surface of the conical end $d^6$ of the casing $d$ and slides or rolls thereon. The contents of the bottle or vessel will flow out through the ports or passages $d^7$, through the tubular casing $d$, through the chamber $b$, and through the ports or passages $b^5$, and this operation may be continued or repeated until the bottle or vessel is entirely emptied. After the bottle or vessel has been emptied it cannot be refilled by pouring liquids thereinto, as in this operation the valve G will be seated by gravity and by the operation of the weight $g^2$ and the opening through the tubular casing $d$ will be closed, as will be readily understood. This operation will be the same in any position in which the bottle or vessel may be held in an effort to pour liquids thereinto, and the weight $g^2$ may be made to serve as a float, in which event it would be impossible to force liquids into the bottle or vessel so as to fill the same, as in this case said float would raise and seat the valve G.

The cap-plate $b^6$ of the upwardly-directed tubular extension $b^4$ of the casing B is intended to prevent any interference with the operation of the valve G, and in the operation of the device, as hereinbefore described, the weight or float $g^2$ will be seated in the downwardly-directed conical extension $d^6$ of the tubular casing $d$ before said weight or float will enter said conical extension far enough to close the ports or passages $d^7$.

The entire device is simple in construction and operation and well adapted to accomplish the result for which it is intended and is also comparatively inexpensive.

Having fully described my invention, I claim as new and desire to secure by Letters Patent—

1. A bottle or other vessel provided with a neck attachment or stopping device, comprising a tubular casing having ports or passages at the top thereof and adapted to be secured in the neck of the bottle or vessel, said tubular casing being also provided with a central downwardly-directed tubular extension, the lower end of which is conical in form and provided with ports or passages, and a valve placed in said tubular casing and adapted to close the upper end of said tubular extension, said valve being provided with a downwardly-directed rod, and a weight loosely connected with the lower end of said rod, said rod being of such length that said weight shall engage the inner wall of said lower conical end of said casing when said bottle is tilted, substantially as shown and described.

2. A bottle or other vessel, provided with a neck attachment or stopper device, comprising a tubular casing having ports or passages at the top thereof and adapted to be secured in the neck of the bottle or vessel, said tubular casing being also provided with a central downwardly-directed tubular extension, the lower end of which is conical in form and provided with ports or passages, a valve placed in said tubular casing and adapted to close the upper end of said tubular extension, said valve having a curved seat-engaging surface and being provided with a downwardly-directed rod, and a spherical weight loosely connected with the lower end of said rod, said rod being of such length that said weight shall engage the inner wall of said lower conical end of said casing when said bottle is tilted, substantially as shown and described.

3. The herein-described neck attachment for bottles or other vessels, comprising a tubular casing which is suitably secured within the neck of the bottle, and which is provided at its upper end with openings or ports, said casing being also provided with a downwardly-directed tubular extension having side ports or passages, and the lower end of which is conical in form, and a valve G which is adapted to close the upper end of said tubular casing, said valve G being provided with a downwardly-directed rod $g$, and a weight $g^2$ loosely connected with the lower end of said rod, said rod being of such length that when said bottle is tilted said weight $g^2$ will engage the inner wall of said conical end of said downwardly-directed tubular extension and force the valve G from its seat, substantially as shown and described.

In testimony that I claim the foregoing as my invention I have signed my name, in presence of the subscribing witnesses, this 29th day of March, 1900.

RICHARD W. H. FUNK.

Witnesses:
F. A. STEWART,
C. C. OLSEN.